N. B. MILTNER.
LINE HOLDER.
APPLICATION FILED APR. 11, 1921.
1,390,152. Patented Sept. 6, 1921.
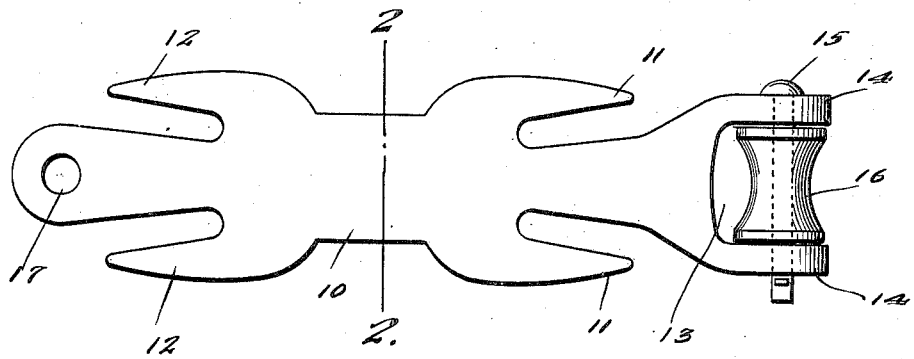
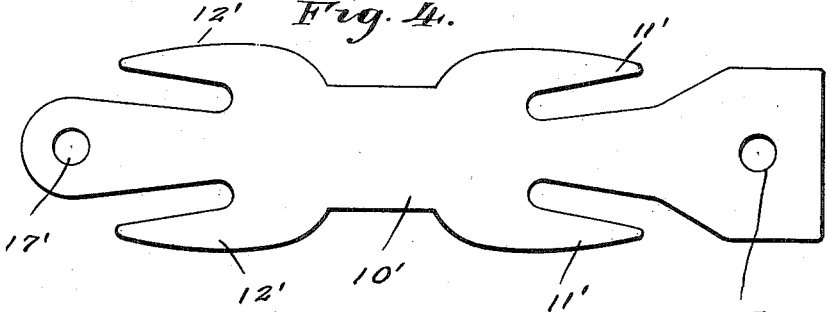
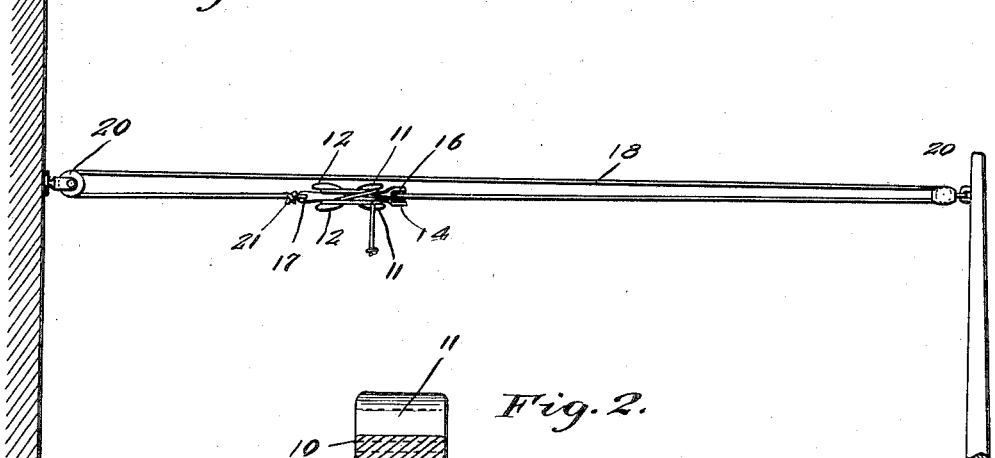
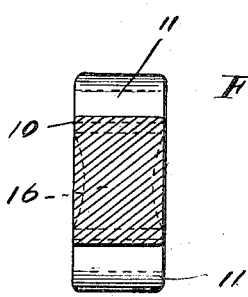
N. B. Miltner INVENTOR

UNITED STATES PATENT OFFICE.

NELSON B. MILTNER, OF PERTH AMBOY, NEW JERSEY.

LINE-HOLDER.

1,390,152.  Specification of Letters Patent.  Patented Sept. 6, 1921.

Application filed April 11, 1921. Serial No. 460,325.

*To all whom it may concern:*

Be it known that I, NELSON B. MILTNER, a citizen of the United States, residing at Perth Amboy, in the State of New Jersey, have invented new and useful Improvements in Line-Holders, of which the following is a specification.

This invention comprehends the provision of a clothes line attachment, designed for association with the adjacent ends of the line, and through the instrumentality of which a line can be adjusted in quick order to regulate its length, and at the same time regulate the degree of tautness to the satisfaction of the user.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein:

Figure 1 is a plan view of the device forming the subject matter of the invention.

Fig. 2 is a sectional view on line 2—2 of Fig. 1.

Fig. 3 is a view showing the manner of using the invention.

Fig. 4 is a plan view of a modified form.

The device forming the subject matter of my invention consists of a plate 10 which may be constructed from any suitable material and may also vary in size and configuration without departing from the spirit of the invention. The plate 10 is cut-away to provide spaced pairs of fingers, the fingers 11 of one pair being arranged at opposite sides of the plate and projecting in the direction of one end thereof, while the fingers 12 of the other pair project in the direction of the opposite end of the plate, being arranged however, in the same longitudinal plane with the fingers 11. Each pair of fingers terminate short of the adjacent extremity of the plate, one extremity being bifurcated as at 13 defining the separated portions 14 which are connected by means of a pin or the like 15. Loosely mounted upon this pin is a spool or the like 16. The opposite end of the plate projects an appreciable distance beyond the adjacent fingers 12 and is provided with an opening through which the line is threaded.

In Fig. 3 I have shown the manner of using the invention, wherein the clothes line is indicated at 18 and is trained over suitable pulleys 20. One end of the clothes line is threaded through the opening 17 and subsequently knotted at 21 to hold the plate at this particular end of the line associated. The opposite end of the line is threaded over the spool 16 and is then wrapped about the corresponding fingers 11 and 12 of one side of the plate 10. This end of the line may also be knotted to prevent it from slipping the fingers and becoming casually separated from the plate 10. It is manifest that the line can be easily shortened to regulate its tautness by pulling the line over the spool 16 and subsequently securing the line to the fingers 12 as above described. The invention is very simple in construction and can be manufactured and sold at a nominal cost.

In Fig. 4 I have illustrated a modified form of the invention wherein 10′ indicates the plate which is constructed in identically the same manner as the plate 10 hereinabove described, except that the corresponding extremity of the plate 10′ instead of being bifurcated to accommodate the roller 16 it is formed with an opening 25 through which one end of the line is threaded. The opposite end of the plate is formed to provide fingers 12′ which are oppositely disposed with respect to the fingers 11′, while the projecting portion of the plate is provided with an opening 17′ through which the line is also threaded. The device shown in Fig. 4 is used in the same manner as the device illustrated in Fig. 1, except the end of the line threaded through the opening 25 is knotted.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A line attachment comprising a plate having an opening at one end through which one end of the line is threaded subsequently secured to the plate, a spool journaled on the opposite end of the plate and over which the line is trained, and means carried by the plate for securing the free end of the line thereto.

2. A line attachment comprising a plate adapted to be secured to one end of the line, one end of the plate being bifurcated defining separate portions, a spool journaled between said separated portions and over which the line is adapted to be trained, and spaced fingers projecting from the sides of the plate and about which the end of the line is adapted to be wrapped for the purpose specified.

3. A device of the class described comprising a plate having an opening at one end, the opposite end of the plate being bifurcated defining separated portions, a spool journaled between said separated portions, spaced pairs of fingers arranged at the opposite sides of the plate and extending in opposite directions.

In testimony whereof I affix my signature.

NELSON B. MILTNER.